Patented Mar. 1, 1949

2,463,030

UNITED STATES PATENT OFFICE 2,463,030

PROCESS OF PURIFYING GLYOXAL

Howard R. Guest, South Charleston, and Raymond W. McNamee, Charleston, W. Va., assignors to Carbide and Carbon Chemicals Corporation, a corporation of New York No Drawing. Application January 31, 1947, Serial No. 725,716

8 Claims. (Cl. 260—601)

This invention relates to a process for separating glyoxal from aqueous solutions containing polymeric glyoxal hydrates.

Pure, monomeric glyoxal, a dialdehyde having the formula, CHOCHO, is a greenish-yellow, mobile liquid with a boiling point of 50.4° C. at 760 mm. and a freezing point of 15° C. However, the monomer is too unstable for shipping or storage as it polymerizes with merely a trace of moisture to form a polymeric glyoxal hydrate which is slowly soluble in water. When glyoxal is dissolved in an excess of water, a somewhat different type of hydrated polymer is formed which is readily soluble in water. As aqueous solutions of glyoxal become more concentrated, the average molecular weight of the hydrated polymer increases.

Because of the propensity of glyoxal to form polymeric hydrates, it is extremely difficult to distill glyoxal monomer from aqueous solutions of glyoxal. Water may be distilled from such solutions under reduced pressure, and if the distillation is carried to dryness, a solid polymeric glyoxal hydrate remains. If carried out on an industrial scale, considerable difficulties attend this method of removing water of solution from aqueous glyoxal solutions. Local overheating of the solid polymeric glyoxal hydrate may occur, resulting in charring. Also, the amorphous, swollen glass-like solid which results is quite difficult to remove from the still.

It has now been found that dispersions or solutions of polymeric glyoxal hydrates may be isolated from their aqueous solutions by adding p-dioxano(b)-p-dioxane

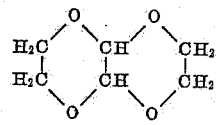

to the solution and distilling off the water. p-Dioxano(b)-p-dioxane is unique in that it is the only non-reactive solvent which has been found for polymeric glyoxal hydrates which will dissolve appreciable quantities of these hydrates. At temperatures above its melting point, 85° C. (mixed sterioisomers) p-dioxano(b)-p-dioxane will dissolve polymeric glyoxal hydrates to form solutions having concentration as high as 50% glyoxal by weight. The only other non-reactive solvent found for polymeric glyoxal hydrates was dioxane, and only 5% solutions could be formed in this solvent. After the water of solution is removed, the solution of polymeric glyoxal hydrates in p-dioxano(b)-p-dioxane is readily withdrawn from the still kettle at temperatures above the melting point of the solution. The removal of the water of solution is facilitated by carrying out the distillation in the presence of a water-immiscible volatile organic liquid which form constant-boiling point mixtures with water. Suitable liquids for this purpose include pentane, dibutyl ether, diisopropyl ether, hexane, benzene, toluene and ethylbenzene.

The solution of polymeric glyoxal hydrates in p-dioxano(b)-p-dioxane is a useful, shippable composition from which monomeric glyoxal may readily be generated. Monomeric glyoxal vapors may readily be obtained from solutions of polymeric glyoxal hydrates by heating such solutions at temperatures of 150 to 250° C. Heating the solutions results in depolymerization of the polymeric glyoxal hydrates to glyoxal and water vapor. In the vapor state, glyoxal and water do not readily combine to form polymeric glyoxal hydrates. Part of the water may be separated from the glyoxal monomer, by passing the mixed vapors over a partial condenser so designed as to offer a minimum of contact between the condensed water and the glyoxal vapors. The glyoxal vapors may then be absorbed in a reactant material to produce any desired glyoxal derivative. For instance, the glyoxal vapors may be absorbed in an alcohol to form glyoxal tetra-acetals.

The principles of this invention may be applied to the purification of glyoxal produced by the vapor-phase oxidation of ethylene glycol as described in U. S. Patents 2,339,282, 2,339,346, 2,339,347 and 2,339,348 to R. W. McNamee and J. T. Dunn. The crude product commercially produced by this process may contain, by weight:

| | per cent by weight |
|---|---|
| Polymeric glyoxal hydrates (as glyoxal) | 30.0 |
| Formaldehyde | 5.0 |
| Formic acid | 1.0 |
| Glycolic acid | 2.0 |
| Ethylene glycol | 8.0 |
| Acetals | 0.5 |
| Water | 53.5 |
| | 100.0 |

It is apparent that this mixture cannot readily be evaporated to recover solid polymeric glyoxal hydrates because it contains formaldehyde which also forms relatively nonvolatile polymeric hydrates. Also, the mixture contains ethylene glycol, which boils at 197.2° C. and thus would accumulate as a residue in a distillation designed to remove water.

The formaldehyde and formic acid may be removed from the mixture by steam distillation, but further purification of the mixture involves the application of the principles of this invention. The first step of the process of this invention involves the transfer of the polymeric glyoxal hydrates from the aqueous solution remaining after the steam distillation to solution in p-dioxano(b)-p-dioxane. This is accomplished by adding a quantity of the dioxano compound to the aqueous solution such that the final concentration of polymeric glyoxal hydrate (as glyoxal) after removal of the water will be about 5, 10 or 15 to 50% by weight. The removal of the water of solution by distillation is greatly facilitated by reducing the pressure in the kettle or by adding an azeotropic entrainer for the water, such as benzene or ethylbenzene. If desired, both of these methods may be practiced simultaneously. Adoption of either one, or both, of these methods of removing water reduces the distillation temperature. This is beneficial as the polymeric glyoxal hydrates react with water to form glycolic acid at an increasing rate as the temperature rises above about 125° C. The following example will illustrate the transfer of polymeric glyoxal hydrate from aqueous solution to solution in p-dioxano(b)-p-dioxane.

*Example 1* p-Dioxano(b)-p-dioxane (308 grams) was placed in a distillation kettle along with 404 grams of an aqueous solution of polymeric glyoxal hydrates having the approximate composition:

| | Percent by weight |
|---|---|
| Polymeric glyoxal hydrates (as glyoxal) | 28.8 |
| Glycolic acid | 4.1 |
| Ethylene glycol | 10.4 |
| Acetals | 0.5 |
| Water | 56.2 |
| | 100.0 |

Benzene (500 cc.) was added to the kettle and the benzene-water azeotrope was distilled. The absolute pressure on the system was progressively reduced to maintain the kettle temperature at about 5° C. until the end of the distillation when the temperature rose to about 100° C. at an absolute pressure of 45 mm. Hg. Under these conditions, about 96% of the glyoxal and about 97% of the glycol charged to the distillation kettle were recovered in the residue. When the distillation was carried out at atmospheric pressure, about 82% of the glyoxal and about 74% of the glycol charged were recovered in the residue. The p-dioxano(b)-p-dioxane, boiling at 216° C. at 760 mm. was almost quantitatively recovered in both instances. The final residue in the kettle was a clear solution solidifying at about 60° C. to form a light yellow homogeneous solid.

A further step in the process of this invention may involve the separation of the glyoxal from the p-dioxano(b)-p-dioxane, and the recovery of the glyoxal in a concentrated, purified state. At temperatures of 150° to 250° C., the hydrated glyoxal polymers which are dissolved in the p-dioxano(b)-p-dioxane rapidly depolymerize to monomeric glyoxal and water. The presence of the p-dioxano(b)-p-dioxane acts as a useful moderator and heat exchange medium for this depolymerization reaction. The presence of a hydrocarbon boiling lower than p-dioxano(b)-p-dioxane, such as benzene, ethylbenzene, toluene, hexane, heptane or octane, in the cracking vessel is also very beneficial, presumably because the hydrocarbon protects the glyoxal vapors from physical condensation or chemical reaction. However, the use of inert gases, such as nitrogen, have proved less satisfactory in this respect.

At the temperatures required to depolymerize the polymeric glyoxal hydrates, the other constituents of the distillation mixture, such as ethylene glycol, glycolic acid, and the p-dioxano(b)-p-dioxane have high vapor pressures. To prevent these constituents from distilling over with the water-hydrocarbon-glyoxal distillate, the usual type of rectifying column is not suitable. This is because a rectifying column depends on intimate contact between the ascending vapors and descending liquid reflux to achieve separation. Under these conditions, the monomeric glyoxal combines with the water present in the liquid reflux to form polymeric hydrates. It has been found, however, that monomeric glyoxal can be separated from the higher-boiling constituents of the mixture by fractional condensation of the ascending vapors from the still. This is achieved by passing the vapors from the still kettle through a partial condenser. By controlling the temperature of the condenser cooling water, for instance, between about 60° and about 100° C., the higher-boiling fraction containing the glycol, glycolic acid, and p-dioxano(b)-p-dioxane is preferentially condensed and returned to the kettle, whereas the vapors of the lower-boiling fraction containing the glyoxal monomer, water, and hydrocarbon pass through the condenser, very little, if any, glyoxal being condensed. In no event, should the vapors be cooled below the dew point of glyoxal monomer in the vapors ascending from the still. The small amount of water which is condensed is returned to the kettle with minimum contact between it and the ascending glyoxal vapors. In industrial practice, this may be accomplished by placing a partial condenser of the shell and tube type having ample vapor passages directly above the kettle. Also, a partial condenser may be designed in which separate passages for ascending vapors and descending liquid is provided by centrifugal separation.

The monomeric glyoxal which passes the partial condenser cannot be condensed and marketed as such for the reason hereinbefore stated. However, the glyoxal may be recovered free of impurities and in a concentrated state, by quenching the vapors in water. By this means, the glyoxal dissolves in water to form the readily soluble polymeric glyoxal hydrates. If the quench water is recycled, the concentration of these hydrates may be built up to any desired degree, the limiting value being the concentration at which the solutions became too viscous to pump, which is about 50% by weight as glyoxal.

The hydrocarbon in the distillate is also condensed by the quench water, but being immiscible therewith, layers out and may be returned to the kettle. Any p-dioxano(b)-p-dioxane present in the distillate preferentially dissolves in the hydrocarbon layer and may be returned to the distillation kettle with the hydrocarbon distillate. Any p-dioxano(b)-p-dioxane remaining in the aqueous product layer may be extracted therefrom with ethylbenzene.

The following experimental results were obtained in the depolymerization of polymeric glyoxal hydrates according to the method described above, the concentration of the polymeric glyoxal hydrate in the dioxano compound being about 25%.

| Run No. | Temperature, °C. | | Depolymerization of Glyoxal Hydrates | | Diluent Fed to Kettle |
|---|---|---|---|---|---|
| | Kettle | Partial Condenser | Yield, percent [1] | Efficiency, percent [2] | |
| 1 | 192 | 80 | 23.4 | 31.7 | Nitrogen. |
| 2 | 190 | 60 | 43.3 | 76.2 | Benzene. |
| 3 | 180 | 74 | 60.6 | 79.8 | Do. |
| 4 | 189 | 83 | 72.6 | 88.5 | Do. |
| 5 | 185 | 83 | 78.8 | 88.8 | Toluene. |
| 6 | 171 | 77 | 50.0 | 68.8 | Ethylbenzene. |
| 7 | 162 | 82 | 30.2 | 41.2 | Do. |
| 8 | 192 | 98 | 68.3 | 88.4 | Do. |
| 9 | 190 | 100 | 68.3 | 78.7 | Do. |
| 10 | 197 | 100 | 75.8 | 90.2 | Do. |
| 11 | 185 | 98 | 61.8 | 76.9 | Do. |

[1] Yield = percent glyoxal hydrates depolymerized and recovered in quench water.

[2] $\text{Efficiency, percent} = \frac{\text{(glyoxal hydrates depolymerized} + \text{glyoxal hydrates recovered in kettle)}}{\text{glyoxal hydrates charged}} \times 100$.

After all the glyoxal hydrates have been distilled from the kettle, there remains therein a mixture of p-dioxano(b)-p-dioxane, ethylene glycol, and a small amount of glycolic acid. Although the glycol and the p-dioxano(b)-p-dioxane may be separated by fractional distillation, their boiling points are so close, being 197° C. and 216° C. respectively, that this is difficult. It has been found p-dioxano(b)-dioxane is preferentially soluble in ethylbenzene and ethylene glycol is preferentially soluble in water, and that the two may be separated by extraction as shown in the following example:

*Example 2*

Ethylene glycol (50 g.), p-dioxano(b)-p-dioxane (50 g.), and water (200 g.) were placed in a flask and warmed until the mixture became a homogeneous liquid. Ethylbenzene (600 cc.) was then added and the temperature increased to 75° C. After stirring for 5 minutes the two liquid layers were allowed to form and the upper layer removed. Upon cooling this layer, p-dioxano(b)-p-dioxane was precipitated and removed by filtration. The ethylbenzene was returned to the kettle and used to extract further the original lower layer. Two extractions removed 96% of the contained p-dioxano(b)-p-dioxane. The water layer, now free of p-dioxano(b)-p-dioxane contained 98.3% of the original ethylene glycol charged.

The depolymerization of the polymeric glyoxal hydrates in p-dioxano(b)-p-dioxane may also be carried out under pressures of about 50 lbs. per sq. in., whereby the tendency of the glycol, glycolic acid and p-dioxano(b)-p-dioxane to distill over with the volatile glyoxal is reduced. Other modifications of the process are also possible and are included in the invention as defined by the appended claims. For instance, the process may be applied to the recovery of glyoxal from the polymeric glyoxal hydrates which are formed by reacting glyoxal sulfate with barium hydroxide.

We claim:

1. Process of removing the water of solution from an aqueous solution of polymeric glyoxal hydrates which comprises adding p-dioxano(b)-p-dioxane to said solution, distilling water from said solution, and recovering a solution of polymeric glyoxal hydrates in p-dioxano(b)-p-dioxane.

2. A normally solid composition of matter comprising a homogeneous solution of polymeric glyoxal hydrates in p-dioxano(b)-p-dioxane, the concentration of said hydrates calculated as glyoxal being from 5 to 50% by weight of said composition.

3. Process of removing the water of solution from an aqueous solution of polymeric glyoxal hydrates which comprises adding p-dioxano(b)-p-dioxane and a liquid aromatic hydrocarbon to said solution, distilling a constant boiling mixture of water and said hydrocarbon from said solution, and recovering a solution of polymeric glyoxal hydrates in p-dioxano(b)-p-dioxane.

4. Process of obtaining monomeric glyoxal which comprises heating a homogeneous solution of polymeric glyoxal hydrates in p-dioxano(b)-p-dioxane at a temperature of 150 to 250° C. to depolymerize the polymeric glyoxal hydrates and to volatilize monomeric glyoxal from said solution.

5. Process of obtaining monomeric glyoxal from an aqueous solution of polymeric glyoxal hydrates which comprises adding p-dioxano(b)-p-dioxane to said solution, distilling the water from said solution to form a residue comprising polymeric glyoxal hydrates dispersed in p-dioxano(b)-p-dioxane and heating said residue at a temperature of 150 to 250° C. to depolymerize the polymeric glyoxal hydrates and to volatilize monomeric glyoxal from said residue.

6. Process of obtaining monomeric glyoxal from a mixture of polymeric glyoxal hydrates and ethylene glycol which comprises forming a solution of said mixture in p-dioxano(b)-p-dioxane, heating said solution at a temperature of 150° to 250° C. to volatilize at least part of the constituents of said solution, cooling the vapors thus formed to a temperature not below the dew point of glyoxal monomer in said vapors to condense ethylene glycol and p-dioxano(b)-p-dioxane from said vapors and returning the materials thus condensed to the heating zone, and withdrawing vapors containing glyoxal monomer from the cooling zone.

7. Process of obtaining monomeric glyoxal from a mixture of polymeric glyoxal hydrates and ethylene glycol which comprises forming a solution of said mixture in p-dioxano(b)-p-dioxane and an aromatic hydrocarbon boiling below p-dioxano(b)-p-dioxane, heating said solution at a temperature of 150° to 250° C. to volatilize at least part of the constituents of said solution, cooling the vapors thus formed to a temperature not below the dew point of glyoxal monomer in said vapors to condense ethylene glycol and p-dioxano(b)-p-dioxane from said vapors and returning the materials thus condensed to the heating zone, and withdrawing vapors containing glyoxal monomer from the cooling zone.

8. Process of separating monomeric glyoxal and ethylene glycol from a mixture of polymeric glyoxal hydrates and ethylene glycol which comprises forming a solution of said mixture in p-dioxano(b)-p-dioxane, heating said solution at a temperature of 150° to 250° C. to volatilize at least part of the constituents of said solution, cooling the vapors thus formed to a temperature not below the dew point of glyoxal monomer in said vapors to condense ethylene glycol and p-dioxano(b)-p-dioxane from said vapors, withdrawing vapors containing glyoxal monomer from the cooling zone, and extracting the condensed ethylene glycol and p-dioxano(b)-p-dioxane with ethylbenzene and water at a temperature above the melting point of p-dioxano(b)-p-dioxane to form two immiscible fractions, one of said fractions being a solution of p-dioxano-(b)-p-dioxane in ethylbenzene and the other fraction being an aqueous solution of ethylene glycol.

HOWARD R. GUEST.
RAYMOND W. McNAMEE.

REFERENCES CITED

The following references are of record in the file of this patent:

UNITED STATES PATENTS

| Number | Name | Date |
| --- | --- | --- |
| 1,815,802 | Schleicher | July 21, 1931 |
| 1,896,100 | Ricard et al. | Feb. 7, 1933 |
| 2,246,049 | Lange | June 17, 1941 |
| 2,331,993 | MacDowell | Oct. 19, 1943 |
| 2,339,160 | Dunn et al. | Jan. 11, 1944 |

Certificate of Correction

Patent No. 2,463,030. March 1, 1949.

HOWARD R. GUEST ET AL.

It is hereby certified that errors appear in the printed specification of the above numbered patent requiring correction as follows:

Column 3, line 57, for "5° C." read *55° C.*; column 5, line 41, for "p-dioxano(b)-dioxane" read *p-dioxano(b)-p-dioxane*;

and that the said Letters Patent should be read with these corrections therein that the same may conform to the record of the case in the Patent Office.

Signed and sealed this 9th day of August, A. D. 1949.

[SEAL]

THOMAS F. MURPHY,
*Assistant Commissioner of Patents.*